United States Patent [19]

Batchelor

[11] 4,263,886

[45] Apr. 28, 1981

[54] METHOD AND APPARATUS FOR CONTROLLING A LIQUID FUEL SPACE HEATER

[75] Inventor: Donald G. Batchelor, Chagrin Falls, Ohio

[73] Assignee: White Consolidated Industries, Inc., Cleveland, Ohio

[21] Appl. No.: 19,310

[22] Filed: Mar. 9, 1979

[51] Int. Cl.³ .......................... F24H 3/00; F23N 1/00
[52] U.S. Cl. ........................... 126/116 A; 126/110 R; 236/15 BB; 236/15 BD; 431/63; 431/74; 431/262; 431/328
[58] Field of Search .................... 431/328, 262, 75, 77, 431/63, 18, 72, 74, 43, 78, 81; 236/15 R, 15 A, 15BB, 15 BD; 126/110 R, 116 A

[56] References Cited

U.S. PATENT DOCUMENTS

| | | | |
|---|---|---|---|
| Re. 25,970 | 3/1966 | Brown | 126/110 R |
| 2,118,642 | 5/1938 | Flynn et al. | 236/15 BB |
| 2,422,734 | 6/1947 | Jung | 236/15 BB |
| 2,494,135 | 1/1950 | Maienshein | 236/15 BB |
| 2,593,978 | 4/1952 | Cajumi | 431/262 |
| 2,594,206 | 4/1952 | Payne | 236/15 BD |
| 2,652,106 | 9/1953 | Cleveland | 431/74 |
| 2,716,455 | 8/1955 | Van Tubergen | 431/262 |
| 3,017,112 | 1/1962 | Amundson | 126/110 R |
| 3,051,227 | 8/1962 | Robson | 126/116 A |
| 3,086,579 | 4/1963 | Brown | 126/110 R |
| 3,173,467 | 3/1965 | Hunter et al. | 236/15 BD |
| 3,219,095 | 11/1965 | Nilsson | 236/15 A |
| 3,266,725 | 8/1966 | Garrison et al. | 236/15 BB |
| 3,420,510 | 1/1969 | Griem | 236/15 BD |
| 3,849,055 | 11/1974 | Stanley et al. | 431/262 |
| 3,964,859 | 6/1976 | Nishi | 236/15 R |

*Primary Examiner*—Daniel J. O'Connor
*Attorney, Agent, or Firm*—Pearne, Gordon, Sessions, McCoy & Granger

[57] ABSTRACT

An electronically controlled space heater includes a ceramic block heating element fed by a metering pump with fixed volume charges of liquid fuel at a rate dependent on temperature requirements. The heating element is located within a combustion chamber. Exhaust gases vented from the combustion chamber are applied directly to a thermocouple whose voltage output is utilized to vary or maintain the frequency of a pulse circuit driving the metering pump. An operator-adjustable potentiometer functions as a thermostat to establish a desired temperature reference value to which the thermocouple output is continuously compared. Start-up and shutdown circuitry precludes the development of unsafe operating conditions.

17 Claims, 6 Drawing Figures

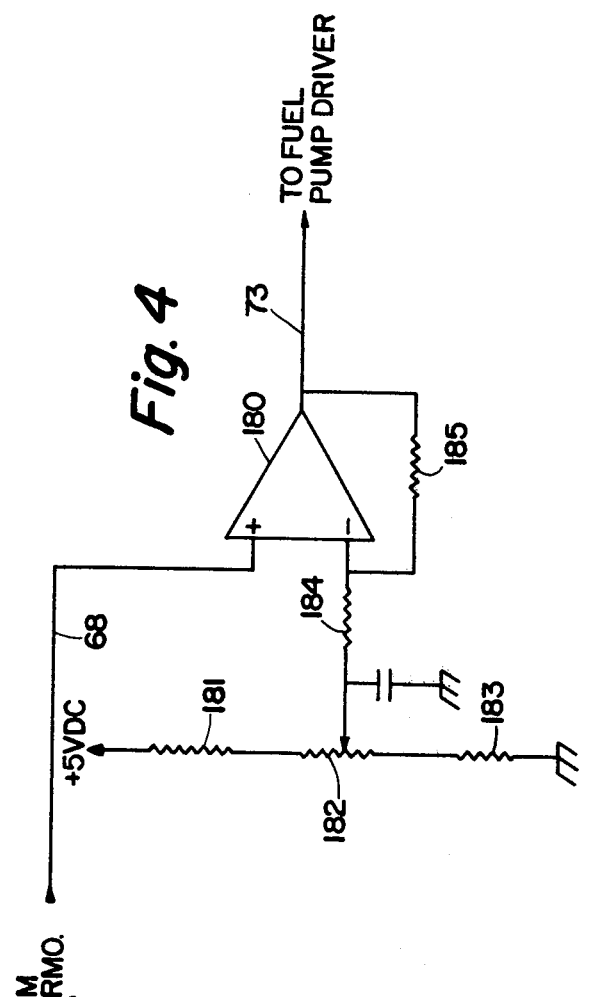
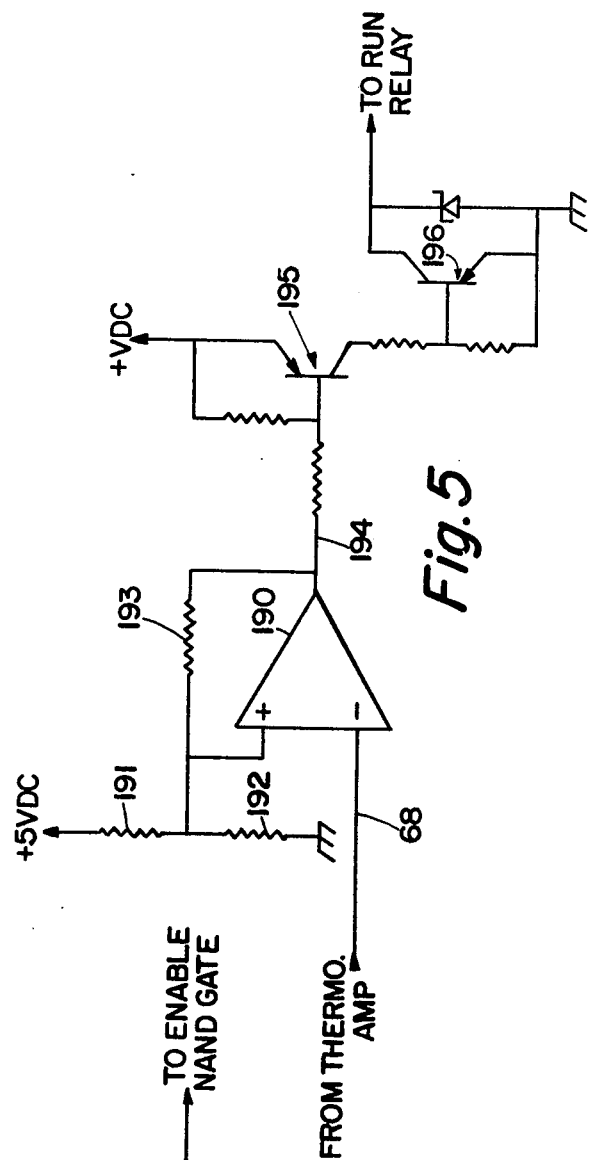
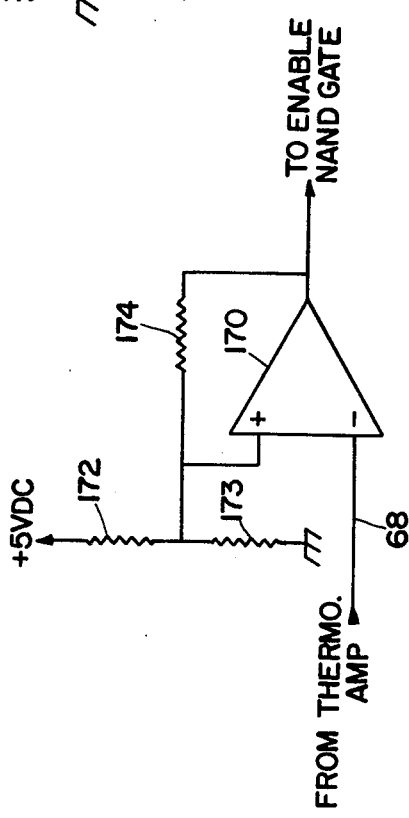

METHOD AND APPARATUS FOR CONTROLLING A LIQUID FUEL SPACE HEATER

BACKGROUND OF THE INVENTION

This invention relates in general to liquid fuel space heaters, and more particularly to compact, forced air space heaters for small closed areas such as vehicle cabs.

An increased realization of the need to conserve energy, and, in particular petroleum distillate fossil fuels or equivalents, has led to attempts to develop energy-efficient space heaters which provide, in a safe and reliable manner, maximum heat output per unit of liquid fuel.

For example, U.S. Pat. No. 3,964,859 to Nishi et al discloses a compact liquid fuel space heater utilizing a flame sensor-regulated metering pump, feeding an impeller-type, heated chamber fuel vaporizer. The Nishi et al heater incorporates numerous temperature sensors and temperature-regulated control elements in an attempt to obtain and maintain optimum fuel combustion. U.S. Pat. No. 3,086,579 to Brown and its U.S. Pat. No. Re. 25,970 disclose a ceramic block heating element, liquid fuel space heater having a non-temperature regulated fuel applying device for establishing a generally constant operating temperature of the heater.

While such devices may increase fuel consumption efficiency and provide a small capacity heater suitable for fulfilling vehicle cab heating requirements, their complexity necessarily leads to reliability problems. Such reliability problems become especially significant where heaters of the type described are installed in the cabs of vehicles that travel great distances from maintenance facilities. The possibility of such a vehicle being stranded in, for example, a blizzard or the like requires that the cab space heater be extremely reliable and safe to operate.

SUMMARY OF THE INVENTION

The present invention provides a method and apparatus for temperature regulating a liquid fuel space heater, preferably of the ceramic block heating element type.

In accordance with the invention, the ceramic block heating element of the space heater is fed fixed volume charges of liquid fuel. The feeding rate or frequency of applying the fuel charges to the heating element is governed by a temperature sensor, such as a thermocouple directly exposed to combustion gases vented from a combustion chamber containing the heating element. Utilizing a feedback-type control system, the temperature sensor output stabilizes the combustion gas temperature by maintaining or varying the feed rate of the fuel charges, preferably applied by means of a metering pump which functions as the sole fuel metering device. The stabilization point of the control system is shifted by an operator-accessible control element, such as a potentiometer, to raise or lower the thermal output of the heater.

A liquid fuel space heater in accordance with the invention has proven to be highly reliable and extremely fuel-efficient. Since fuel application is regulated by combustion temperature, the method and apparatus of the present invention are advantageously adaptable for use with a wide range of fuels, such as heating oil, kerosene, diesel fuel, and the like.

BRIEF DESCRIPTION OF THE DRAWINGS

FIG. 3 is a schematic diagram of a run temperature limit circuit suitable for use in the control system illustrated by FIG. 1;

FIG. 4 is a schematic diagram of a temperature control circuit suitable for use in the control system illustrated by FIG. 1;

FIG. 5 is a schematic diagram of an ignition control circuit suitable for use in the control system illustrated by FIG. 1.

DETAILED DESCRIPTION OF THE DRAWINGS

Figure 1:
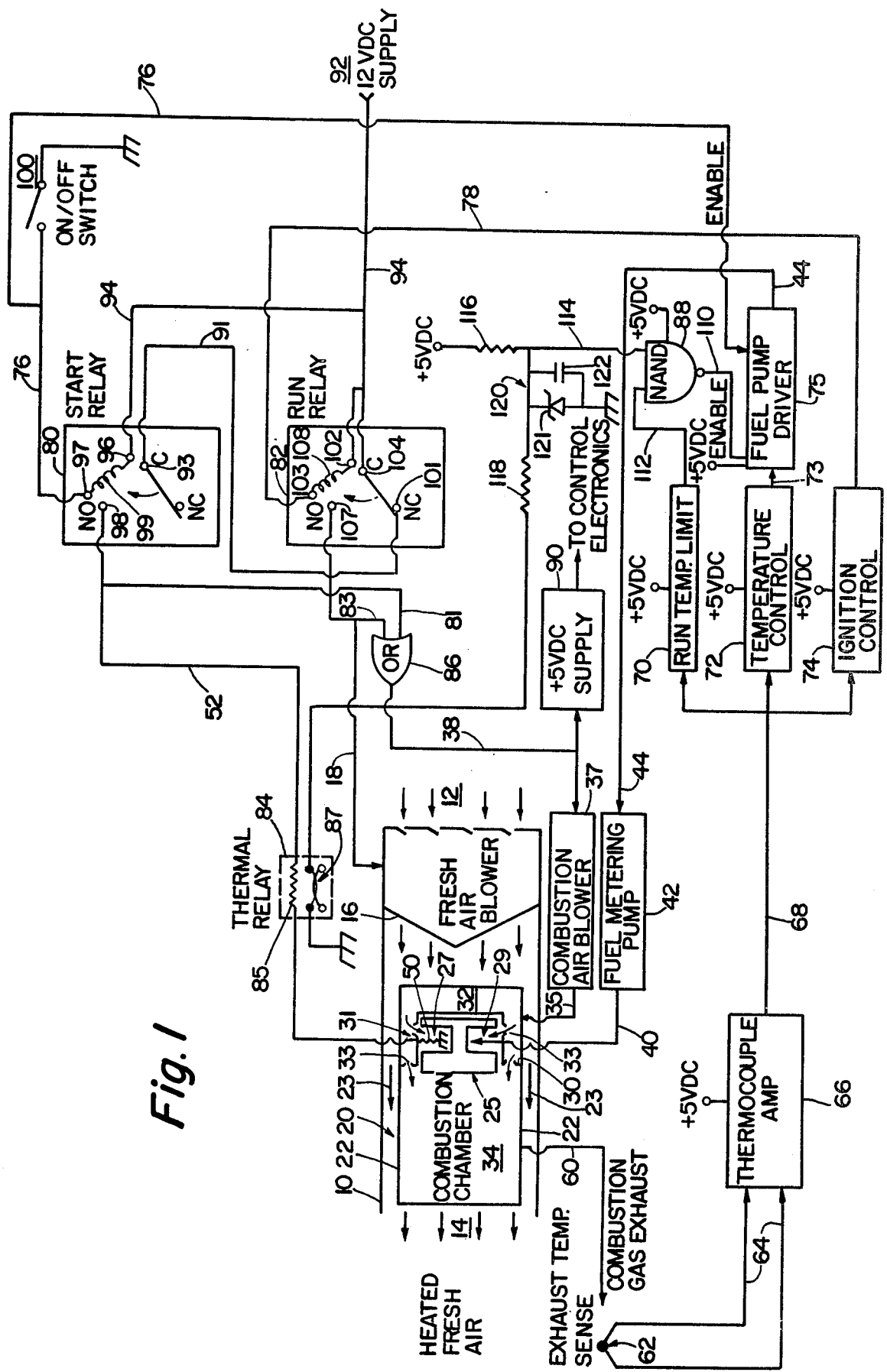
FIG. 1 is an overall schematic diagram of a liquid fuel space heater and its control system in accordance with the present invention.

Referring to the drawings in greater detail, and in particular to FIG. 1, there is illustrated in schematic form an electronically controlled liquid fuel space heater in accordance with the present invention.

A heater housing 10, preferably cylindrically shaped and formed of sheet metal or the like, provides a vent-like, fresh air intake end 12 and a heated fresh air exhaust end 14. Forced air flow from the intake end 12 to the exhaust end 14 is provided by a fresh air blower 16 located preferably within the cylindrical heater housing 10 at its intake end 12, as illustrated. Actuation and deactuation of the fresh air blower 16 are controlled by energizing and de-energizing a fresh air blower power line 18.

Located immediately downstream from the fresh air blower 16 and within the heater housing 10 as illustrated is a generally closed combustion chamber 20 which preferably is cylindrical in shape and coaxially oriented relative to the cylindrical heater housing 10. The combustion chamber 20 provides a metallic, thermally conductive, cylindrical wall 22 or the like suitable as means for efficient heat exchange between such wall 22 and bypassing fresh air supplied via the fresh air blower 16, as earlier disclosed. Such wall 22 could, for example, include cooling fin-type structures, longitudinally extending air channels, or the like. It could be noted that the combustion chamber wall 22 is spaced from the housing 10 to permit the passage of forced fresh air 23 therebetween for optimum heating of such bypassing fresh air. It should further be noted that numerous heat exchange members could be circumferentially positioned to support the combustion chamber in its spaced relationship within the housing 10, as illustrated in FIG. 1.

Heating of the combustion chamber wall 22 for effective heat exchange is provided by a heating element 25, preferably in the form of a fuel porous, ceramic block of the type illustrated by the earlier-noted Brown U.S. Pat. No. Re. 25,970. The heating element 25 is cylindrical in shape, and provided with an igniter receptor blind bore 27 and one or more fuel injector receptor blind bores 29 (only one shown). Preferably, the bores 27,29 extend perpendicularly into the surface of the ceramic block heating element 25. It is noted that numerous igniter/injector bore configurations have been found acceptable.

The interior volume of the combustion chamber 25 is divided by a baffle plate 30 into a supply air plenum area 32 and a combustion area 34. Preferably, the cylindrical ceramic block heating element 25 is set into a centered, cuplike depression 31 of the baffle 30, the depression 31 extending toward the fresh air blower 16, as illustrated. Communication between the combustion area 34 and the supply air plenum area 32 is provided via a plurality of air injection apertures 33 extending through the baffle plate 30. A combustion air inlet conduit 35 supplies air to the plenum area 32, the supplied air in turn being provided by a combustion air blower 37, which is actuated and deactuated by energizing and de-energizing a combustion air blower power line 38, which also applies power to a +5 VDC electronic supply 90.

Suitable liquid fuel is applied to the porous ceramic block heating element 25, preferably by direct injection via a fuel line 40 supplied by a solenoid-actuated, piston-type, positive displacement metering pump 42, of a conventional type. The pump 42 is powered by current pulses comprising a pump control signal 44. A suitable pump for such application is manufactured by the Valcor Engineering Corp. of Kenilworth, N.J. and sold as a Series SV-500 metering pump.

Ignition of the applied fuel is initially provided by means of an electrically resistive heating element 50 located within the igniter receptor bore 27 of the heating element 25. Energization and de-energization of the resistive heating element 50 is provided via an igniter power line 52.

A combustion gas exhaust outlet conduit 60, communicating with the combustion area 34, directly applies combustion gases to an exhaust temperature sensor in the preferred form of a thermocouple junction 62. It is to be noted that equivalent temperature sensors are considered to be within the scope of the present invention. A thermocouple output signal 64 is fed as an input to a thermocouple amplifier 66 which in turn provides an amplified thermocouple output signal 68 which is simultaneously fed to a run temperature limit circuit 70, a temperature control circuit 72, and an ignition control circuit 74. A temperature control output signal 73 determines the operating frequency of a fuel pump driving pulse circuit 75, which in turn provides the pump control signal 44 to the fuel metering pump 42, which preferably functions as the sole metering device for applying fuel to the heating element 25.

Start-up and shutdown sequences of the liquid fuel space heater illustrated by FIG. 1 are controlled by a start relay 80, a run relay 82, a thermal relay 84, an OR gate 86, and a NAND gate 88, the exact operation of these elements to be subsequently explained. A CMOS type 4011 NAND gate has been found to be suitable for use as the NAND gate 88. Preferably, the OR gate is in the form of parallel diodes having their current outputs tied together, such OR gate configuration being well known in the art. Appropriate power to the circuitry elements previously noted is provided, for example, by the +5 VDC power supply 90.

The operation of the liquid fuel space heater illustrated by FIG. 1 will now be described in detail, wherein such heater is applied as a vehicle cab heater, the vehicle providing a +12 VDC supply 92.

A 12-volt supply line 94 is provided, as illustrated, to both the start relay 80 and the run relay 82. Both relays 80,82 are of the single pole, double throw type, each relay providing five connection terminals, namely, a common terminal, a normally open terminal, a normally closed terminal, and a pair of relay actuating terminals.

With particular reference to the start relay 80, the 12-volt supply line 94 is connected to one start relay actuating terminal 96. The other start relay actuating terminal 97 is connected directly to the fuel pump driver circuit 75 via a first enable signal line 76, the function of such first enable signal line 76 to be subsequently explained. The terminal 97 is also electrically connected to one terminal of an SPST on-off switch 100 having its other terminal electrically grounded.

With reference to the run relay 82, the 12-volt supply line 94 is connected to one run relay actuating terminal 102 and to a run relay common terminal 104. The other run relay actuating terminal 103 is connected via an ignition control signal line 78 to the ignition control circuit 74.

A typical starting sequence of the liquid fuel space heater illustrated by FIG. 1 will now be described.

On moving the on-off switch 100 to a closed or conductive position, a start relay actuating coil 99 is electrically energized and acts in a conventional manner to close a start relay normally open contact 98. With the start relay held in its energized condition, power is applied to the grounded, resistive heating element 50 via the igniter power line 52, which in turn is connected to the start relay common terminal 93, which in turn is connected by an inter-relay power line 91 to the normally closed run-relay terminal 101 of the run relay 82, the 12-volt supply line 94 being provided to the normally closed run relay terminal 101 via the run relay common terminal 104. Under these initial start-up conditions, the run relay 82 remains unenergized while the start relay is energized, the ignition control circuit 74 maintaining the ignition control signal line 78 at an ungrounded condition to preclude run relay energization.

With 12-volt power being supplied to the resistive heating element 50 via the relays 80,82, as earlier explained, the resistive element 50 begins to heat the surrounding ceramic block element 25 to provide ignition of liquid fuel applied thereto. At this point in time, no fuel is being applied to the heating element 25 for reasons to be subsequently discussed.

Series-connected into the path of the igniter control signal 52 is a resistive thermal relay actuating element 85, which itself begins to heat, the element 85 being immediately adjacent to a normally open, bimetallic switch 87 which moves to a closed or conductive condition upon reaching a predetermined temperature. Such bimetallic, thermally actuated switches are well known in the art.

In addition to the provision of power to the resistive heating element 50, closing of the on-off switch 100 provides a first enable signal to the fuel pump driver circuit 75 via the first enable signal line 76.

Operation of the fuel pump driving pulse circuit 75 requires that both the first enable signal line 76 and a second enable signal line 110 simultaneously apply appropriate enable signals to the fuel pump driving circuit 75.

The second enable signal, applied to the fuel pump driving pulse circuit 75 via a second enable signal line 110, is provided by the output of the NAND gate 88, which has two inputs 112,114. In accordance with known principles, the application of a signal equivalent to a logic 0 to either input of the NAND gate 88 will provide a signal equivalent to a logic 1 constituting the second enable signal to the fuel pump driving pulse circuit 75. On the other hand, the provision of simultaneous signals, each equivalent to a logic 1, at the NAND gate inputs 112,114 will provide a logic 0 or the lack of a second enable signal to the fuel pump driving pulse circuit 75, wherein operation of the fuel metering pump 42 will be precluded.

Upon initial start-up of the illustrated space heater, with the on-off switch 100 closed and the start relay energized, a logic 1 is provided at NAND gate input 114, since the bimetallic switch 87 is in an open condition, voltage being applied to the input 114 by a series-connected resistor 116. A stabilizing circuit 120 composed of a single diode 121 paralleled by a transient suppression capacitor 122 is connected between the NAND gate input 114 and electrical ground, to establish a stable logic 1 value when the bimetallic switch 87 of the thermal relay 84 is in an open condition. Also, the run temperature limit circuit 70 provides a logic 1 signal to the NAND gate input 112 in a manner to be subsequent illustrated. Under these conditions, the second enable signal line 110 does not supply an enable signal to the fuel pump driving pulse circuit 75. At this point in time, the ceramic block element 25 is being heated, but fuel is not being applied since the pump driving pulse circuit 75 is being inhibited by the lack of a second enable signal on line 110.

Simultaneous with the energization of the resistive heating element 50, as earlier explained, power is applied to operate the combustion air blower 37 via the OR 86, which has one of its inputs 81 connected directly to the start relay normally open contact 98, to which power is applied as heretofore explained. It should be noted that the ventilation air blower at this time is not operating.

With the provision of combustion air to the supply air plenum area 32, and with the ceramic block element 25 being heated to a high degree by the resistive heating element 50, the combustion chamber 25 is prepared for fueling. Preferably, the combustion air supply plenum chamber 32 is pressurized and air is injected adjacent the ceramic block heating element 25 via the air injection apertures 33, as illustrated.

At a predetermined temperature, the bimetallic switch 87 of the thermal relay closes to ground the NAND gate input 114 via a series-inserted resistor 118, whereby a signal equivalent to a logic 0 is applied to the NAND gate input 114. With a logic 0 provided at the input 114 of the NAND gate 88, an appropriate second enable signal is provided via enable line 110, wherein the fuel pump driving pulse circuit commences operation at an initial predetermined maximum frequency, thus providing the fuel metering pump 42 with driving pulses whereupon fixed volume fuel charges are applied directly to the highly heated ceramic heating element 25. Near instantaneous ignition of the applied fuel occurs. In accordance with known principles, a fuel/air vapor is burned as a vapor at a surface of the ceramic block heating element 25, such burning extending into the combustion chamber and heating the walls 22 for heat exchange, as earlier discussed. During the burning process, gases are vented via the combustion gas exhaust conduit 60 and applied directly to the thermocouple sensor 62. The thermocouple signal output signal 64, indicative of a rising combustion gas exhaust temperature, is simultaneously applied via the thermocouple amplifier 66 to the temperature control circuit 72, to the run temp limit circuit 70, and to the ignition control circuit 74.

It can be seen that, should an open circuit occur in the resistance heating element 50, fueling of the space heater would be precluded, since the thermal relay actuating element 85 in turn would not heat due to lack of current flow, thus keeping bimetallic switch 87 in an open condition, whereupon a logic 1 would continue at the gate 114 of the NAND gate 88, the other NAND gate input 112 remaining at a logic 1 as heretofore explained, wherein a NAND gate output of logic 0 or the lack of an enabling signal would prohibit operation of the fuel pump. It can be seen that this fail-safe feature advantageously functions to preclude unsafe operation of the space heater wherein fuel would be applied to the ceramic heating element without ignition.

Upon normal start-up of the heater, wherein combustion has been initiated, the amplified thermocouple output signal 68 reaches a value indicative of a predetermined combustion exhaust gas temperature (e.g., 200° F.), wherein the ignition control circuit 74 is activated to electrically ground the ignition control signal line 78 in a manner to be subsequently illustrated. The grounded ignition control signal line 78 is connected to the other actuating terminal 103 of the run relay 82, whereupon the run relay 82 is energized to open its normally closed contact 101 and to close a normally open contact 107. It can be seen that energization of the run relay 82 removes the 12-volt power applied via the inter relay power line 91 from the common terminal 93 of the start relay 80, such power removal de-energizing the electric resistance heater 50 and the series-connected thermal relay activating element 85, whereupon the bimetallic switch 87 begins to cool. It can also be seen that upon actuation of the run relay 82, power to the combustion air blower 37 and the +5 VDC supply 90 is no longer applied from the start relay 80 via diode input 81. To maintain power to the combustion air blower 37 and the power supply 90, a second power path is provided from line 94 via the now-closed, normally open terminal 107 of the energized run relay 82, the other input 83 of the OR gate 86 being energized. It can also be seen that actuation of the run relay 82 applies power to the fresh air blower 16 via the fresh air blower control power line 18, which is also electrically connected to the run relay contact 107. It can be seen that during initial start-up, the fresh air blower 16 remains off until the combustion gas exhaust reaches a temperature indicative of a heated condition of the combustion chamber 20, whereupon the run relay 82 is energized. Thus, the circulation of cold ventilating air is avoided.

As the space heater continues to operate, the combustion gas exhaust temperature continues to rise to a point (e.g., 400° F.), wherein the run temperature limit circuit 70 removes the logic 1 signal from the NAND gate input 112 to provide a logic 0 input in a manner to be subsequently illustrated. At this point in time, logic zeroes are applied to both NAND gate inputs 112,114. With de-energization of the thermal relay 84 by the ignition control circuit 74, as earlier explained, the bimetallic switch 87 eventually cools and opens to re-establish a logic 1 on input 114 of NAND gate 88. It can be seen that the run temperature limit circuit 70 functions to ensure that fuel combustion continues to take place on a self-sustaining basis subsequent to the de-energization of the resistance heating element 50 upon energization of the run relay 82. If, subsequent to the de-energization of the heating element 50, a flameout condition should occur within the combustion chamber area 34, the combustion gas temperatures would start to drop so as not to reach the run temperature limit circuit requirement (400° F.), whereupon the logic 1 signal would remain on the input 112 of the NAND gate 88. Upon cooling and opening of the bimetallic switch 87, a logic 1 would also be applied at the input 114 of the NAND gate 88, whereupon a logic 1 at both input gates 112,114 would provide a logic 0 on the enable line 112, whereupon the fuel metering pump 42 would be inhibited from providing further fuel. Such a safety feature ensures that fuel will not be provided to the combustion chamber 20 where there has been a failure in the self-ignition of fuel subsequent to de-energization of the resistive heating element 50 which provides initial fuel ignition.

Assuming that initial ignition has taken place and is sustained, the space heater illustrated in FIG. 1 is now in a running condition, whereupon the frequency of pump driving pulses provided by the fuel pump driving circuit 75 is regulated in accordance with the level of the amplified thermocouple output signal 68 provided to the temperature control circuit 72.

The temperature control circuit 72 functions to provide a reference value to which the amplified thermocouple output signal 68 is continuously compared. Such reference value can be varied by the user to establish the operating temperature of the heater, the exact manner of varying the reference value to be subsequently explained. When such reference value and the amplified thermocouple output signal 68 are in a predetermined relationship, the frequency of pulses initially provided to the fuel pump 42 by the fuel pump driving pulse circuit 75 is minimized via a temperature request signal 73 to maintain a combustion temperature. Where the combustion gas exhaust temperature begins to drop, such imbalance is sensed by the temperature control circuit 72, which in turn instructs the fuel pump driving circuit to increase the frequency of fuel metering pump driving pulses.

The shutdown sequence of the liquid fuel space heater, in accordance with the invention as illustrated by FIG. 1, will now be discussed.

To shut off the space heater, the on-off switch 100 is moved to its off position, whereupon the start relay 80 is de-energized and the enable signal supplied to the fuel pump driving circuit 75 via the first enable signal line 76 is removed, whereupon the fuel pump driving pulse circuit 75 is inhibited from supplying further actuating pulses to the solenoid-type fuel metering pump 42. With fuel application terminated to the ceramic block heating element 25, the combustion gas exhaust temperature begins to drop. It should be noted that at this time the run relay 82 remains actuated, since the ignition control circuit 74 is still grounding, via the ignition control signal line 78, the run relay actuating element 108. With the run relay 82 remaining in its actuated or closed condition, the combustion air blower 37 and the ventilation air blower 16 continue to operate so as to purge and cool the combustion chamber 20. Upon the continuously lowering combustion gas exhaust reaching a predetermined temperature (e.g., 200° F.) as sensed by the thermocouple junction 62, the ignition control circuit 74 removes grounding from the run relay terminal 103 to de-energize the run relay 82. Upon de-energization of the run relay 82, +12 VDC power is removed from the normally open terminal 107, whereupon power supplied to the fresh air blower 16, to the combustion air blower 73, and to the +5 VDC supply 90 is terminated. De-energization of the run relay 82 also reapplies power to the common terminal 93 of the start relay 80 in preparation for a future start-up sequence.

It can be seen that safe and efficient operation of the liquid fuel space heater is provided by the control method and apparatus illustrated in FIG. 1. Unsafe operation of the heater is precluded by ensuring that fuel is never applied to the ceramic block heating element unless fuel ignition is occurring. Further, the fresh air blower and combustion air blower continue to operate subsequent to the termination of fuel application until the combustion gas exhaust lowers to a predetermined temperature indicative of a safe shutdown point for the space heater. Further, the quick sensing of temperature changes by the thermocouple junction 62 permits continuous and almost instantaneous regulation of fuel requirements to maintain optimum combustion and stable temperature operation. Further, numerous fuels of different combustion characteristics, such as heating oil, kerosene, and diesel fuel, can be utilized, since fuel application is regulated directly by combustion temperature.

Samples of specific circuitry means for use in the apparatus illustrated by FIG. 1 will now be discussed.

Figure 2:
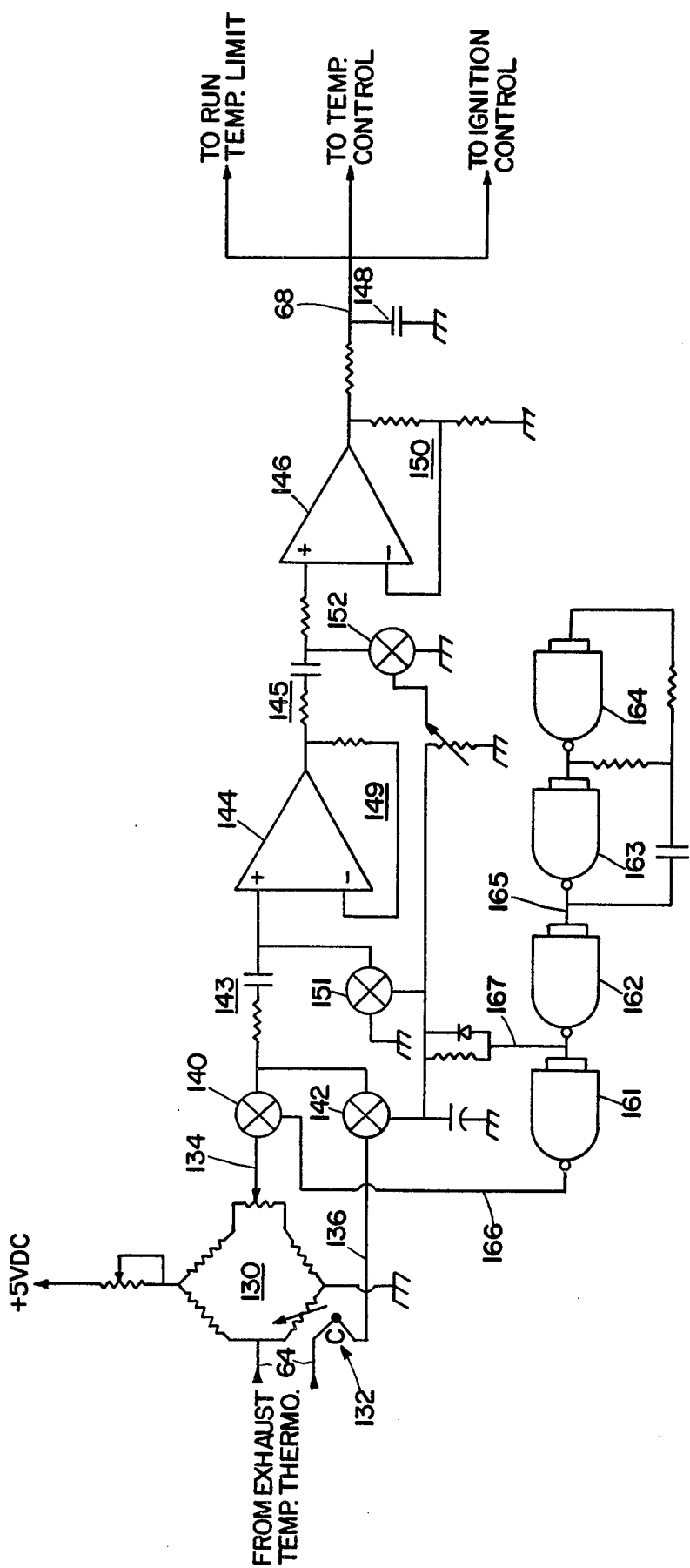
FIG. 2 is a schematic diagram of a chopper-stabilized amplifier suitable for use in the control system illustrated by FIG. 1.

Turning to FIG. 2, there is illustrated an amplifier suitable for use in practicing the present invention, as earlier noted with respect to the thermocouple amplifier 66. The amplifier illustrated by FIG. 2 is conventional in nature and preferably is in the form of a chopper-stabilized amplifier suitable for amplifying the microvolt signal output of a typical thermocouple. A preferred form of the amplifier of FIG. 2 includes a compensating bridge network 130 with zero adjust for offsetting the voltage provided by an ambient temperature thermocouple junction 132 which is series-connected with the exhaust temperature thermocouple junction 62 illustrated in FIG. 1. A pair of input leads 134,136 extends from the bridge/thermocouple circuitry to a pair of analog switches 140,142. The analog switches 140,142 function as sampling gates triggered in a manner to be described subsequently. Positive gain, closed-loop mode, operational amplifiers 144,146, series-connected as illustrated and preceded by appropriate offset circuits 143,145, function to amplify the thermocouple signal and apply it via a filtering capacitor 148 to the run temp limit circuit 70, the temperature control circuit 72 and the ignition control circuit 74. Appropriate operational amplifier feedback circuitry 149,150, conventional in nature, is provided as indicated between the outputs of the amplifiers 144,146 and their inverting inputs (−). An additional pair of analog switches 151,152 is provided at the respective noninverting inputs (+) to the operational amplifiers 144,146 and are gated to return said inputs to an offset value in a well known manner. Gating or chopping of the input signal 64 to provide stabilized amplification is provided by four NAND gates 161,162,163,164 each having their inputs strapped together to function as inverters. The gates 163,164 are provided with appropriate RC time constant components, as illustrated, to function as an astable multivibrator oscillating at a predetermined chopping frequency. A periodic chopping or gating signal is provided at the output 165 of the NAND gate 163 as an input to NAND gate 162, which functions as an inverter, which in turn has its inverted output applied as an input to NAND gate 161, which also functions as an inverter. The output 166 of NAND gate 161 is connected to gate analog switch 140, while the output 167 of NAND gate 162 is connected to simultaneously gate analog switches 142,151, and 152.

In accordance with conventional chopper-stabilized amplifier operation, a series of pulses at the output of the operational amplifier 146, each having an amplitude varying in proportion to the level of the thermocouple output signal 64 are provided to the capacitor 148, which filters the pulse signal to provide a varying analog signal, the amplitude of which is directly proportional to and indicative of the combustion gas exhaust temperature at the location of the thermocouple junction 62. It is this varying analog signal that is provided to the run temperature limit circuit 70, the temperature control circuit 72, and the ignition control circuit 74. It should be noted that CMOS type 3130 operating amplifiers have been found to be suitable for use as amplfiiers 144,146. Further, CMOS type 4066 analog switches have been found to be suitable for use as analog switches 140,142,151,152. Further, CMOS TYPE 4011 NAND gates have been found to be suitable for use as NAND gates 161,162,163,164.

The run temperature limit circuit 70 is illustrated in FIG. 3, wherein the amplified thermocouple output signal 68 is applied to the inverting input (−) of an operational amplifier 170 of, for example, the CMOS LM124 type. The noninverting input (+) of the amplifier 170 in turn is connected to a resistance network comprised of resistors 172,173,174, which functions in a known manner to provide a reference point to which the amplified thermocouple signal 68 is, in effect, compared in a well known manner. When the amplified thermocouple output signal 68, supplied to the inverting input (−) of the operation amplifier 170 is in a predetermined relationship with the reference value applied at the noninverting input (+) of the amplifier 170, an output signal equivalent to a logic 1 or a logic 0 is applied to the input 112 of the NAND gate 88 as previously illustrated with regard to FIG. 1. for example, the reference value provided by the resistive network comprising resistors 172,173,174 could be indicative of an exhaust gas temperature of approximately 400° F. Such a temperature would indicate that self-sustaining combustion had occurred within the combustion chamber as earlier explained, and that a logic 0 could be applied to the input 112 of the NAND gate 88 to sustain continued operation of the fuel pump, as earlier noted.

Turning to FIG. 4, there is illustrated a circuit suitable as the temperature reference control circuit 72, which includes an operational amplifier 180, of for example the CMOS LM 124 type, having its noninverting input (+) provided with the amplified thermocouple output signal 68. A suitable resistor network, comprising resistors 181,182,183,184, and 185, establishes a temperature request reference value at the inverting input (−) of the operational amplifier 180 to which the amplified thermocouple output signal 68 is, in effect, compared continuously in a known manner. The amplitude of the temperature signal request provided by the operational amplifier 180 is determined by the relationship between the signal provided via line 68, and the reference value impressed at the inverting input (−) of the operational amplifier 180. The reference value at the inverting input (−) of the operational amp 180 is set to correspond to a desired combustion gas temperature correlating to the desired temperature of the heated fresh air supplied by the heater. It is to this reference value that the heater is stabilized for continuous operation, as noted earlier. Means for raising or lowering the operating temperature of the space heater illustrated in FIG. 1 is provided by resistor 182, which is in the form of an operator-accessible potentiometer. It can be seen that the reference value applied to the inverting input (−) of the operational amplifier 180 can be varied by appropriate adjustment of the potentiometer resistor element 182. With the inverting input (−) and the noninverting input (+) of the operational amplifier 180 in a predetermined stabilized condition relative to each other, the analog signal, provided as the temperature request signal 73, determines the frequency of driving pulse supplied to the metering pump to stabilize or maintain the combustion gas at a temperature set by operator adjustment of the potentiometer element 182.

Turning to FIG. 5, there is illustrated a suitable circuit for use as the ignition control circuit 74 discussed earlier with regard to FIG. 1. In a similar manner, as explained earlier with regard to FIGS. 3 and 4, an operational amplifier 190, for example of the CMOS LM124 type, has its noninverting input (+) provided with a reference value signal by a resistive network comprising resistors 191, 192, and 193 connected in the known manner. The amplified thermocouple output signal 68 is applied to the inverting input (−) of the operational amplifier 190. Upon the thermocouple amplifier signal reaching a predetermined value relative to reference value applied to the noninverting input (+) of the operational amplifier 190, a suitable base driving signal 194 is applied from the output of the operational amplifier 190 to an appropriately biased, relay triggering, PNP transistor 195, which in turn triggers, into conducting condition, a relay grounding, PNP transistor 196. Turning on of the transistor 196 effectively grounds the ignition control signal line 78 to energize the run relay 82 as earlier explained with regard to FIG. 1. For example, the reference value supplied by the resistor network comprising resistors 191,192,193 can be indicative of a combustion exhaust gas temperature of 200° F. When the signal 68 reaches such value indicative of a combustion exhaust gas temperature of 200° F., the operational amplifier 190 provides a signal which switches on transistor 195, which in turn switches on transistor 196 so as to ground line 78 and switch on the run relay 82 to de-energize the resistive heating element 50, as noted earlier. When the signal 68, applied to the inverting input (−) of the operational amplifier 190, drops below a value indicative of a 200° combustion exhaust temperature, transistors 195,196 are switched off and the run relay is de-energized, such a condition occurring during a heater shutdown purge cycle, as previously explained.

Figure 6:
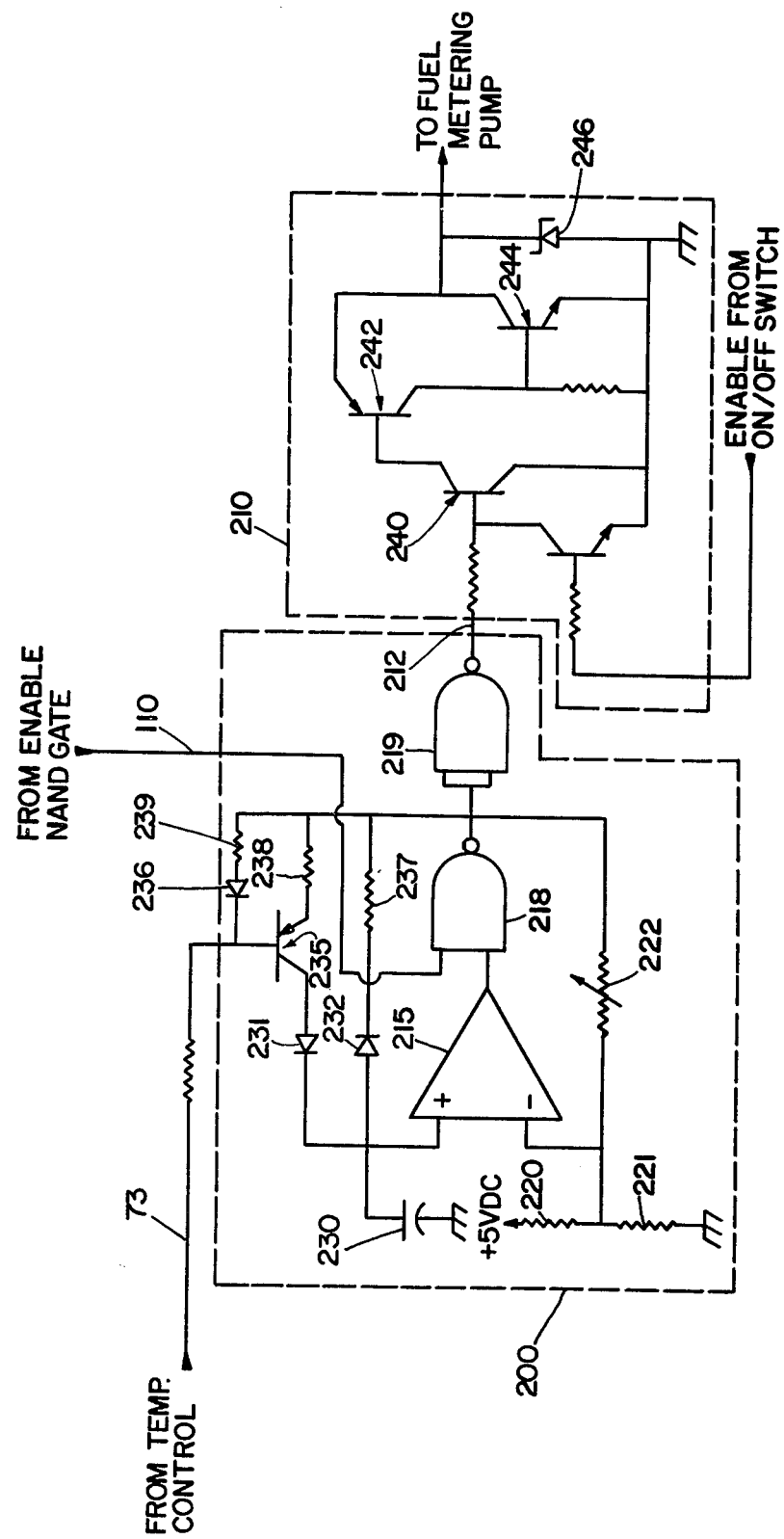
FIG. 6 is a schematic diagram of a fuel pump driving circuit suitable for use in the control system illustrated by FIG. 1.

Turning to FIG. 6, there is illustrated a circuit suitable as the pump driving pulse circuit 75 (FIG. 1) for driving the metering pump 42 at a varying frequency dependent upon the fuel requirements of the heater, as solely determined by temperatures at the thermocouple junction 62.

In general, the pump driving circuit includes an oscillator 200 and a pulse amplifying circuit 210. The oscillator 200 functions to provide at its output 212 a series of square wave DC pulses of fixed amplitude and pulse width, the frequency of the pulses provided at output 212 being determined by the value of the analog temperature request signal 73 applied thereto. As noted earlier with regard to FIGS. 3, 4, and 5, an operational amplifier 215, of for example the CMOS type LM124, is provided having its output feeding one input of an enable NAND gate 218, which in turn has its output feeding to the strapped input of an inverting NAND gate 219. The enable NAND gate 218 functions in a well known manner to inhibit application of the operational amplifier output to the oscillator output 212 when there is no enable signal (logic 1) on the second enable signal line 110, as previously explained with regard to FIG. 1. The inverting input (−) of the operational amplifier 215 is connected to a resistive network comprising resistors 220, 221, and 222, resistor 222 being variable to adjust, in a well known manner, the pulse width provided by the oscillator circuit 200. the noninverting input (+) of the operational amplifier 215 is connected to a frequency determining circuit comprising a capacitor 230, diodes 231,232, a charging PNP transistor 235, a diode 236, and resistors 237 238, and 239, these elements being connected as schematically illustrated in FIG. 6. It can be seen that a change in the amplitude of the temperature request signal 73 correspondingly increases or decreases (primarily a function of the charging rate of capacitor 230) the frequency of the pulses provided at the output 212 of the oscillator 200 when an enable signal (logic 1) is applied to the NAND gate 218.

Turning to the pulse amplifying circuit 210, the low power pulses at the output 212 of the oscillator 200 are applied to the base of a transistor 240, which in turn supplies base current to a first power transistor 242, which in turn supplies base current to a second power transistor 244, the output of which is stabilized by a zener diode 246. The three amplifier stages provided by transistors 240,242,244 supply suitable pulses of sufficient amplitude (power) to drive the solenoid metering pump 42 described earlier with regard to FIG. 1. A pump-inhibiting transistor 248 is turned on when the first enable signal line 76 is ungrounded, i.e., when the on-off switch is in an open condition and the run relay is energized, thus effectively grounding the base of the transistor 240 so as to preclude amplification of any signals applied to the pulse amplifying circuit 210, thus inhibiting operation of the fuel metering pump 42. It can be seen that the variable frequency oscillator 200 feeding its pulse output 212 into the amplifier 210 effectively provides pump actuating pulses, the actuated metering pump 42 in turn providing fixed volume fuel charges to the ceramic block heating element 25 at a frequency or rate in accordance with the temperature request signal 73 from the temperature control circuit 72, as illustrated earlier.

The present invention as illustrated by FIGS. 1 through 6 has been found to provide a fuel efficient space heater having stable combustion parameters, high reliability, and quick response to changing heating requirements.

Although preferred embodiments of this invention have been shown and described, it should be understood that various modifications and rearrangeents of the parts may be resorted to without departing from the scope of the invention as disclosed and claimed herein.

What is claimed is:

1. A method of temperature regulating a liquid fuel space heater having a ceramic block heating element comprising the steps of:
   applying a plurality of separate fixed volume charges of liquid fuel directly to the ceramic block heating element;
   igniting the applied fuel for continuous burning at a face of the ceramic block heating element;
   sensing a temperature indicative of the rate of burning of the fuel at the face;
   providing a measurement signal proportional to the sensed temperature;
   providing a reference value indicative of a desired rate of burning of the fuel;
   comparing the measurement signal to the reference value; and
   varying the rate of applying the charges of liquid fuel to the ceramic block heating element to maintain said signal and said reference value in a predetermined relationship.

2. A method of temperature regulating a liquid fuel space heater having a vented combustion chamber containing a ceramic block heating element, comprising the steps of:
   applying a plurality of separate fixed volume charges of liquid fuel directly to the ceramic block heating element;
   igniting the applied fuel for continuous burning at a face of the ceramic block heating element;
   sensing the temperature of combustion gases vented from the combustion chamber;
   providing a measurement value proportional to the sensed temperature;
   providing a reference value indicative of a desired temperature of vented combustion gases; and
   varying the rate of applying the charges of liquid fuel to the ceramic block heating element to maintain said signal and said reference value in a predetermined relationship.

3. A method according to claims 1 or 2, including the step of varying the reference value to vary said temperature.

4. A method according to claims 1 or 2, wherein the fuel charges are applied by directly injecting each of said fuel charges into the ceramic block heating element.

5. A liquid fuel space heater comprising:
   a combustion chamber having a combustion air inlet and a combustion gas outlet;
   a ceramic block heating element contained within the combustion chamber;
   a metering pump means sequentially applying at a variable rate a plurality of separate fixed volume charges of liquid fuel directly to the ceramic block heating element;
   igniter means for initiating continuous burning of the applied fuel at a face of the ceramic block heating element;
   a temperature sensor located at said outlet and exposed directly to combustion gases vented from the combustion chamber, the sensor providing a measurement signal indicative of the temperature of the vented combustion gases; and
   control means for varying said rate of applying the fuel charges to maintain said measurement signal at a predetermined reference value.

6. A liquid fuel space heater according to claim 5, including a ventilation air blower and heat exchanger means for transferring thermal energy between the combustion chamber and air supplied by the ventilation air blower.

7. A liquid fuel space heater according to claim 5, wherein the combustion chamber is separated by a baffle plate into a supply air plenum area communicated with said inlet and a combustion area communicating with said outlet, the ceramic block heating element being within the combustion area and adjacent the baffle plate, the baffle plate being perforated at areas immediately adjacent the ceramic block heating element to provide combustion air thereto, each of the fuel charges being injected directly into the ceramic block heating element.

8. A liquid fuel space heater according to claim 7, including blower means connected to the inlet for forcing combustion air into the supply air plenum area and maintaining the plenum at a pressure above ambient pressure.

9. A liquid fuel space heater comprising:
a heater housing having a fresh air inlet and a fresh air outlet;
a ventilation blower for forcing air from the fresh air inlet to the fresh air outlet;
a closed combustion chamber located within the heat exchanger housing, the combustion chamber having a combustion air inlet conduit and a combustion gas outlet conduit;
a combustion air blower for forcing air into the combustion air inlet;
a ceramic block heating element located within the combustion chamber;
a metering pump means sequentially injecting a plurality of separate fixed volume charges of liquid fuel directly into the ceramic block heating element;
igniter means for initiating continuous burning of the injected fuel at a face of the ceramic block heating element;
a thermocouple element located within the outlet conduit and exposed directly to combustion gases vented from the combustion chamber, the thermocouple element providing a measurement signal indicative of the temperature at the thermocouple location; and
control means responsive to the measurement signal for cycling said meter pump at a rate required to maintain the measurement signal at a predetermined reference value.

10. A liquid fuel space heater according to claims 5 or 9, including means for changing the reference value to effect concurrent changes in said measurement signal.

11. A liquid fuel space heater according to claim 9, wherein the fresh air outlet and combustion gas outlet conduit are vented to separate areas.

12. A liquid fuel space heater according to claim 11, wherein the fresh air inlet and the combustion air inlet conduit draw from separate air sources.

13. A liqud fuel space heater according to claim 9, wherein the metering pump is a solenoid-actuated positive displacement piston pump.

14. A liquid fuel space heater according to claim 13, wherein said piston pump is manually adjustable for varying its displacement by altering the stroke of its piston.

15. In a liquid fuel space heater having a vented combustion chamber containing a ceramic block heating element directly and sequentially injected with a plurality of separate fixed volume liquid fuel charges by a solenoid-operated positive displacement piston-type metering pump, an electronic control circuit comprising:
a thermocouple junction directly exposed to combustion gases vented from the combustion chamber, the junction providing a measurement signal indicative of the temperature of the vented combustion gases;
a potentiometer for providing a desired temperature reference value indicative of a desired vented combustion gas temperature;
means for comparing the measurement signal and the reference value, the means for comparing providing a control output signal the value of which is dependent upon a predetermined relationship between the measurement signal and the reference value; and
a pulse circuit for driving the solenoid-operated pump, the pulse circuit providing a firing pulse to activate a stroke of the solenoid pump, the rate of firing pulses provided by the pulse circuit to the pump being proportional to the value of the control output signal provided by the means for comparing.

16. A control circuit according to claim 15, wherein the potentiometer is operator-accessible to permit its adjustment, thereby establishing another desired temperature reference value.

17. A control circuit according to claim 15, including igniter means activated and deactivated in response to predetermined values of the measurement signal.

* * * * *